Nov. 23, 1954     R. C. RILEY     2,695,094
ASCENDING AND DESCENDING ENDLESS ESCALATOR
Filed Dec. 26, 1952     5 Sheets-Sheet 1
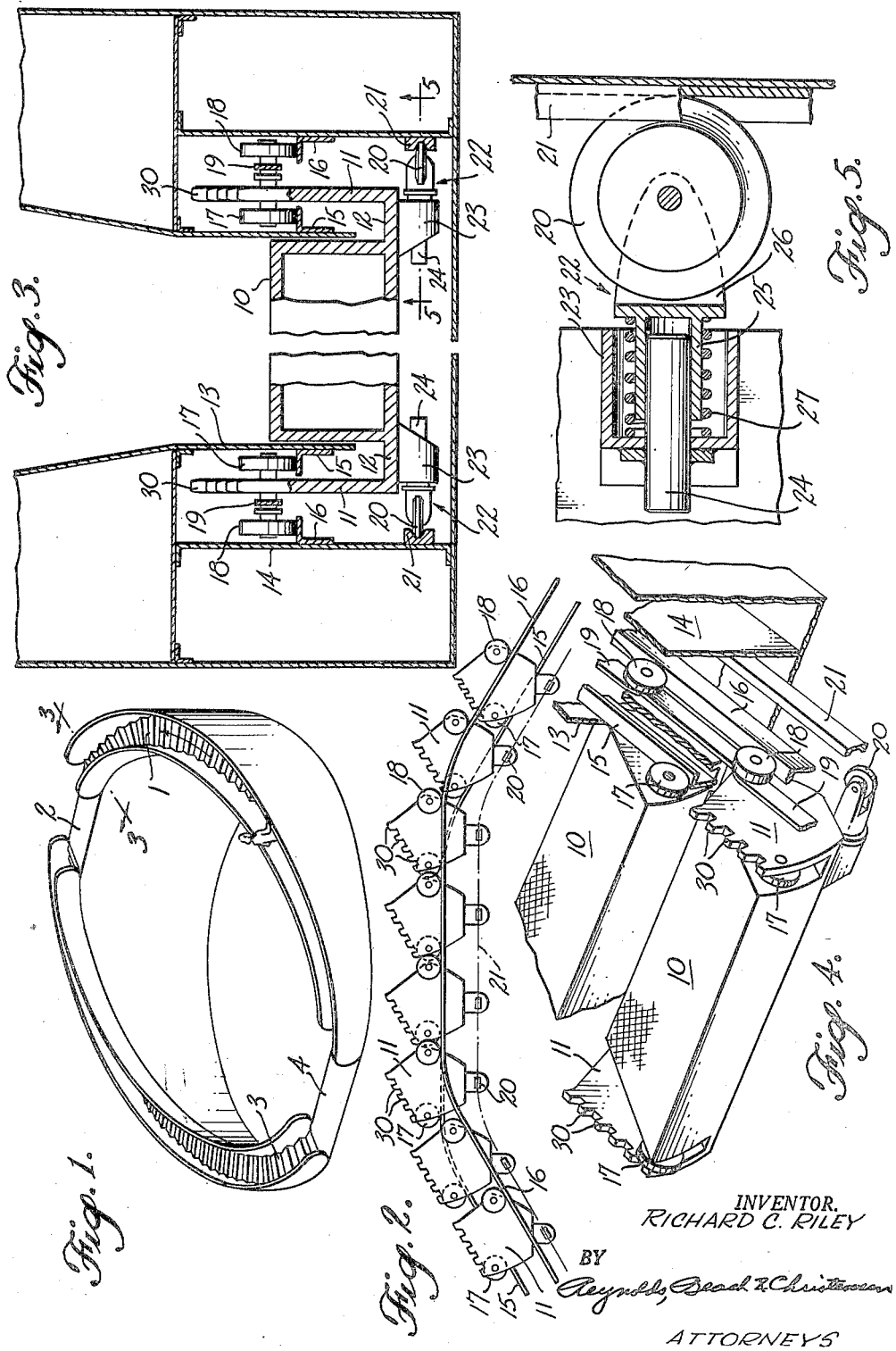
INVENTOR.
RICHARD C. RILEY
BY
ATTORNEYS Nov. 23, 1954

R. C. RILEY 2,695,094

ASCENDING AND DESCENDING ENDLESS ESCALATOR

Filed Dec. 26, 1952

INVENTOR.
RICHARD C. RILEY
BY
Reynolds, Beach & Christensen
ATTORNEYS

Nov. 23, 1954 R. C. RILEY 2,695,094
ASCENDING AND DESCENDING ENDLESS ESCALATOR
Filed Dec. 26, 1952 5 Sheets-Sheet 4
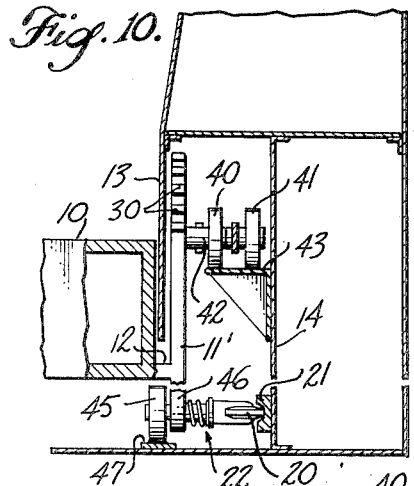
Fig. 10.
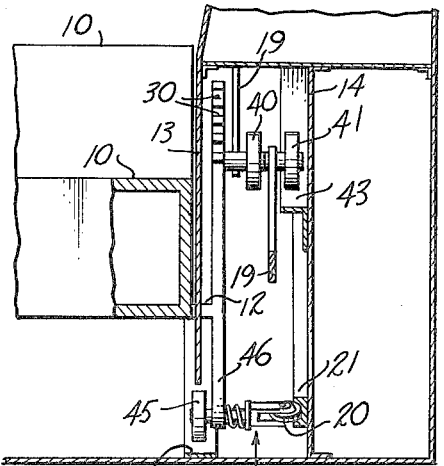
Fig. 11.
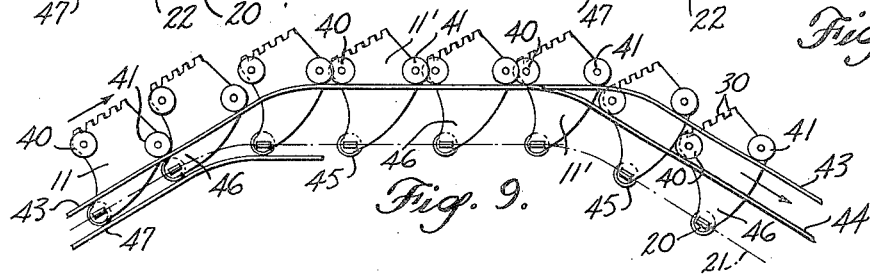
Fig. 9.
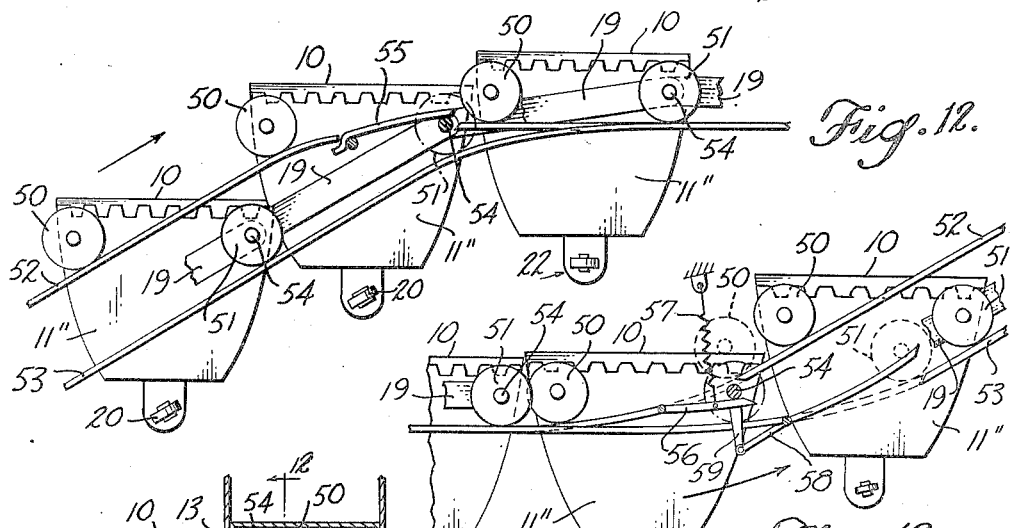
Fig. 12.
Fig. 13.
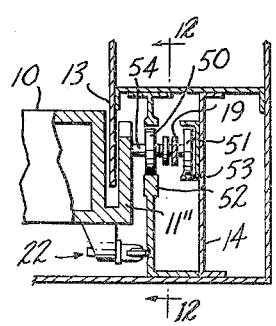
Fig. 14.
INVENTOR.
RICHARD C. RILEY
BY
Reynolds, Beach & Christensen
ATTORNEYS Nov. 23, 1954     R. C. RILEY     2,695,094
ASCENDING AND DESCENDING ENDLESS ESCALATOR
Filed Dec. 26, 1952     5 Sheets-Sheet 5

INVENTOR.
RICHARD C. RILEY
BY
ATTORNEYS

United States Patent Office 2,695,094
Patented Nov. 23, 1954

2,695,094

ASCENDING AND DESCENDING ENDLESS ESCALATOR

Richard C. Riley, Seattle, Wash.

Application December 26, 1952, Serial No. 327,997

5 Claims. (Cl. 198—17)

The present invention relates to escalators and especially to escalators of the endless type having ascending and descending flights in series. The mechanism of this invention constitutes an improvement on the mechanism disclosed in my copending application Serial No. 167,549, filed June 12, 1950, now Patent No. 2,641,351.

Ordinarily escalators are straight and include a flight stretch either ascending or descending and a return stretch moving in the opposite direction. Consequently, only one-half of the riser and tread units, or less, are usefully employed in such a system. It is an object of the present invention to provide a practical escalator in which nearly all of the riser and tread units are in useful position at the same time, approximately half constituting an ascending flight and the other half constituting a descending flight.

In such an escalator it is an object to guide the riser and tread units firmly so that if pressure is applied off the center of a tread the tread will not be tilted to throw the person stepping on it out of balance. Moreover, the guiding mechanism will resist displacement of the tread and riser units by unexpected stresses placed on the system by unexpectedly great friction at some point, or by part of the system catching unexpectedly. If such a situation should occur, suitable safety mechanism is provided to deenergize the drive.

A further object is to provide an effective and compact driving mechanism which will distribute the driving force over a substantial portion of the escalator so that no parts will be overloaded, and so that wear will be kept to a minimum.

Particularly in an escalator of the endless type including ascending and descending flights in series, it is an object to arrange such flights in circular formation, which will be held in expanded condition so as to eliminate backlash between the various parts or reduce the play as far as possible. Moreover, in such an endless escalator structure, it is an object to guide the flights so that the propelling force exerted substantially at one location will not cause any portion of either flight to buckle, but substantially the entire endless escalator will be disposed in an incline despite its circular comformation in plan.

More specifically, it is an object to provide a tread-supporting roller at each corner of each tread for running on suitable tracks to prevent tilting of the tread when an off-center force is applied to it. Moreover, the tracks for such rollers are arranged so that the rollers can guide such treads both during ascending movement, level movement and descending movement. Endwise guiding of the tread members is accomplished by spring-pressed rollers carried by opposite ends of the tread and riser units, which rollers run in grooved trackways to hold the tread and riser units against vertical displacement.

The drive of the escalator preferably is accomplished by gearing which propels both the inner and outer ends of tread and riser units simultaneously, and is located in a flight portion of the escalator, so that it is not necessary to guide the portions of the escalator between the ascending and descending flights substantially out of the plane of such flights.

Special safety switching mechanism may include movable track portions receiving members carried by the tread and riser units, which track portions will be displaced by an unexpected displacing force acting generally radially of the escalator, and movement of a track member thus effected caused either by excessive tensioning or relaxing of the escalator will effect deenergization of the drive.

Other advantages and objects of the present mechanism will be understood more clearly from the following specific description of the preferred type of apparatus illustrated in the drawings.

Figure 1 is a top perspective view of an escalator of the type to which the present invention pertains.

Figure 2 is a fragmentary side elevation view, shown somewhat diagrammatically, of the level portion of the escalator interconnecting the ascending and descending flights at the upper story.

Figure 3 is a vertical sectional view with parts broken away of a horizontal portion of the escalator, such as taken on line 3—3 of Figure 1.

Figure 4 is a detail fragmentary top perspective view of interconnected tread and riser units of the escalator in one of the flights with parts broken away.

Figure 5 is a detail sectional view through a portion of the tread and riser unit guide mechanism taken on line 5—5 of Figure 3.

Figure 9 is a side elevation view, shown somewhat diagrammatically, of the upper horizontal portion of the escalator and adjacent sections of the ascending and descending flights generally comparable to Figure 2, but illustrating a different type of escalator guide mechanism.

Figure 10 is a radial sectional view through an end portion of a tread and riser unit and its associated guide mechanism of the type shown in Figure 9, taken at a horizontal moving portion of the escalator.

Figure 11 is a similar section taken through an inclined portion of the escalator mechanism.

Figure 12 is a side elevation view of a section of the escalator at the junction of the rising flight and upper horizontal portion, showing a different type of guide mechanism.

Figure 13 is a side elevation view of a portion of the escalator at the junction between the lower horizontal portion and the ascending flight.

Figure 14 is a radial sectional view through a portion of the escalator guide mechanism of the same type taken through a horizontal escalator portion.

Figure 6:
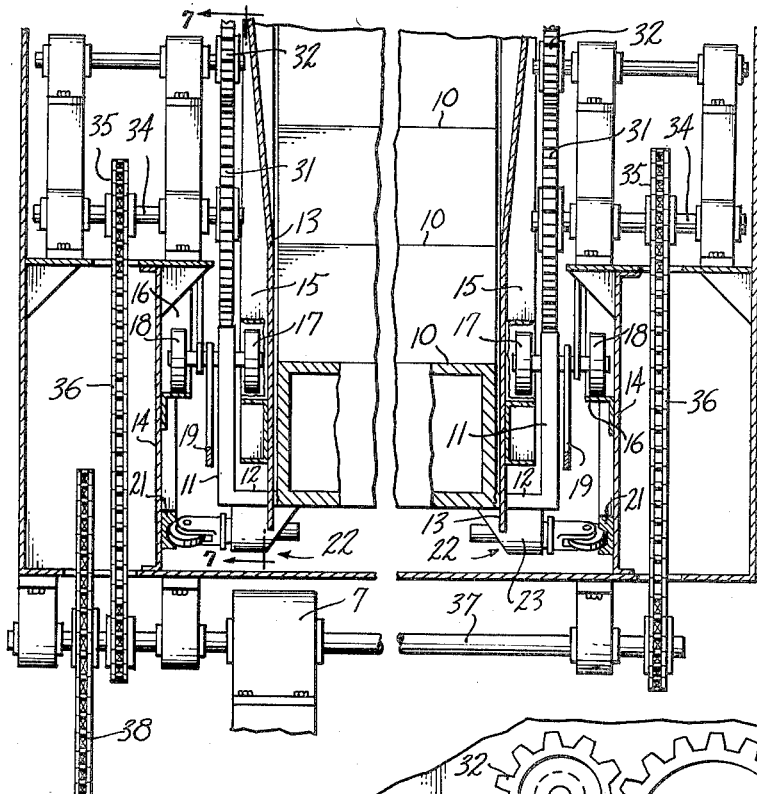
Figure 6 is a vertical sectional view taken radially through an escalator flight at the location of the drive mechanism, parts thereof being broken away.

The general type and arrangement of the escalator disclosed in the present application is similar to that disclosed in my aforementioned copending application Serial No. 167,549, but in this instance improved guiding, driving and control mechanism is included. Figure 1 shows the general arrangement of the escalator, including the ascending flight 1, a horizontal portion extending beneath the upper landing platform 2, a descending flight 3, and a lower horizontal portion extending under the lower landing platform 4. The ascending flight 1 and the descending flight 3 lie in the same general inclined plane, and the upper horizontal portion beneath the platform 2 will be slightly below that plane, while the lower horizontal portion beneath the platform 4 will be slightly above such plane. In plan the ascending flight 1 and the descending flight 3 form substantially a circle, so that in the inclined plane such flights together with the connecting horizontal portions define substantially an ellipse.

The escalator is composed of tread and riser units 10 which are tapered slightly radially inward and are symmetrical about their longitudinal central planes, so that a similar riser is provided at each side of the tread. Integral with these riser and tread units are drive gear plates 11 at opposite ends of each unit, and in the form of tread and riser units shown in Figures 3 and 4, such drive gear plates are carried by webs 12 interconnecting the lower portions of the tread and riser unit ends with the lower edges of plates 11.

In the type of mechanism shown in Figures 2, 3 and 4, the tread and riser units are suspended by the end plates 11. The framework of the escalator includes a downwardly extending flange 13 received in the space between the plate 11 and the adjacent end of the tread and riser unit. At the opposite side of the plate 11 is an additional web 14 of the framework. The flange 13 carries a track 15 and the web 14 carries a track 16, along which run wheels 17 and 18 respectively, mounted on axles projecting from opposite sides of the end plate 11. Interconnecting the axles of rollers 18 of adjacent tread and riser units are links 19 which cooperate to form an endless chain encircling the outer ends of the tread and riser units in the escalator, and a similar chain interconnects the radially inner ends of the tread and riser units of the escalator. Interconnection of the tread and riser units at opposite ends by such chains 19 insure that such units will be driven simultaneously, and that the proper spacing between them will be maintained at all times. The tread portions of the units are curved, as shown in Figure 4, in order to compensate for vertical movement between these units during transition from a flight to a horizontal portion of the escalator.

The tracks 15 and 16 on which rollers 17 and 18 ride are wider than such rollers so that the tread and riser units may shift endwise a reasonable amount. Since these rollers are located one at each corner of the tread and riser unit, such unit is supported in highly stable fashion, so that even if a downward load is applied on one corner of the tread, the unit will not be tilted. Such tracks 15 and 16 are, of course, horizontal in the horizontal portions, as shown in Figure 2, and are inclined along the flight portions of the escalator as shown in Figures 4 and 2. Since the tracks 15 and 16 do not restrain endwise movement of the tread and riser units, it is desirable to provide guide mechanism for controlling such movement. Such control can be effected most advantageously if backlash between adjacent tread and riser units is virtually eliminated. Both of these results may be accomplished by providing locating rollers 20 or shoes engaged with tracks 21 carried by the webs 14 of the framework. Such rollers or shoes and tracks should interfit to prevent upward or downward movement of the tread units relative to these tracks, so that the treads will not be depressed by a downward load on them, nor will they be raised by tension on the chains 19 effected by application of the driving force to the escalator. In the form shown the rollers 20 engage in grooves of tracks 21, but it will be evident that the rollers may have recessed peripheries which would fit over the opposite sides of rail bars to produce the same effect.

To reduce or eliminate the backlash between adjacent tread and riser units in an endless escalator having a circular plan form conformation, it is merely necessary to urge all the tread and riser units radially outward. This effect can be accomplished by supporting the rollers or guide members 20 on spring-pressed plungers 22, received in guide sleeves 23, carried by the bottoms of the tread and riser units. The detailed construction of such spring-pressed plungers is shown in Figure 5. Within the sleeve 23 may be mounted a guide rod 24, on which a socket element 25 fits. This socket element carries the roller-supporting yoke 26 which may swivel on the rod 24 to enable the guide roller 20 to turn for following the track 21 as it passes from an inclined position to a horizontal position at the upper or lower horizontal portions of the escalator. The socket member 25 is urged endwise away from the tread and riser unit by a compression spring 27, encircling the socket member 25 and guide rod 24. Such springs for the guide elements at the radially inner ends of the tread and riser units are considerably stiffer than the springs for the guide units at the radially outer ends of the tread and riser units. Consequently all the tread and riser units will be urged radially outward to expand the loop of the escalator as far as the linkage 19 will permit, and play between the adjacent tread and riser units is thus reduced to a minimum.

In propelling the escalator it is preferred that the drive mechanism be mounted in a framework adjacent to a flight portion of the escalator, because room for such drive mechanism should not be provided at the horizontal or landing portions of the escalator. To prevent any unnecessarily abrupt change of direction of the tread and riser units it is preferred that such units pass in a horizontal line close beneath the horizontal landing platforms 2 and 4, shown in Figure 1. To afford access to such landing platforms it is evident that there can be no framework, at least at one side of each landing platform, capable of housing drive mechanism. Consequently the present drive mechanism is located along one of the escalator flights to avoid the necessity of excessively dipping the escalator at the landings 2 and 4. Preferably such drive mechanism is located near the upper end of the ascending flight, so that it will tend to lift this portion of the escalator where the load is greatest. Alternatively the drive mechanism could be located near the lower end of the descending flight, or, in fact, it is possible to place the drive mechanism at virtually any location along either the ascending or descending flight.

Figure 7:
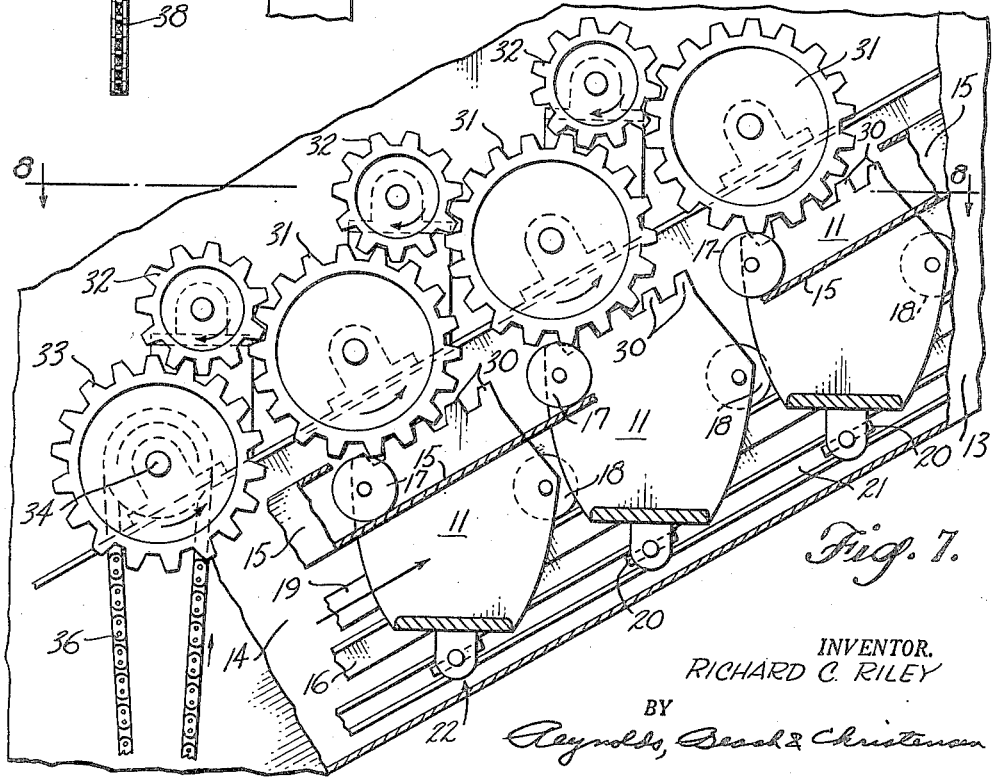
Figure 7 is a side elevation view of the drive mechanism illustrating in end elevation portions of the tread and riser units driven by such mechanism, as seen looking from line 7—7 in Figure 6.
Figure 8:
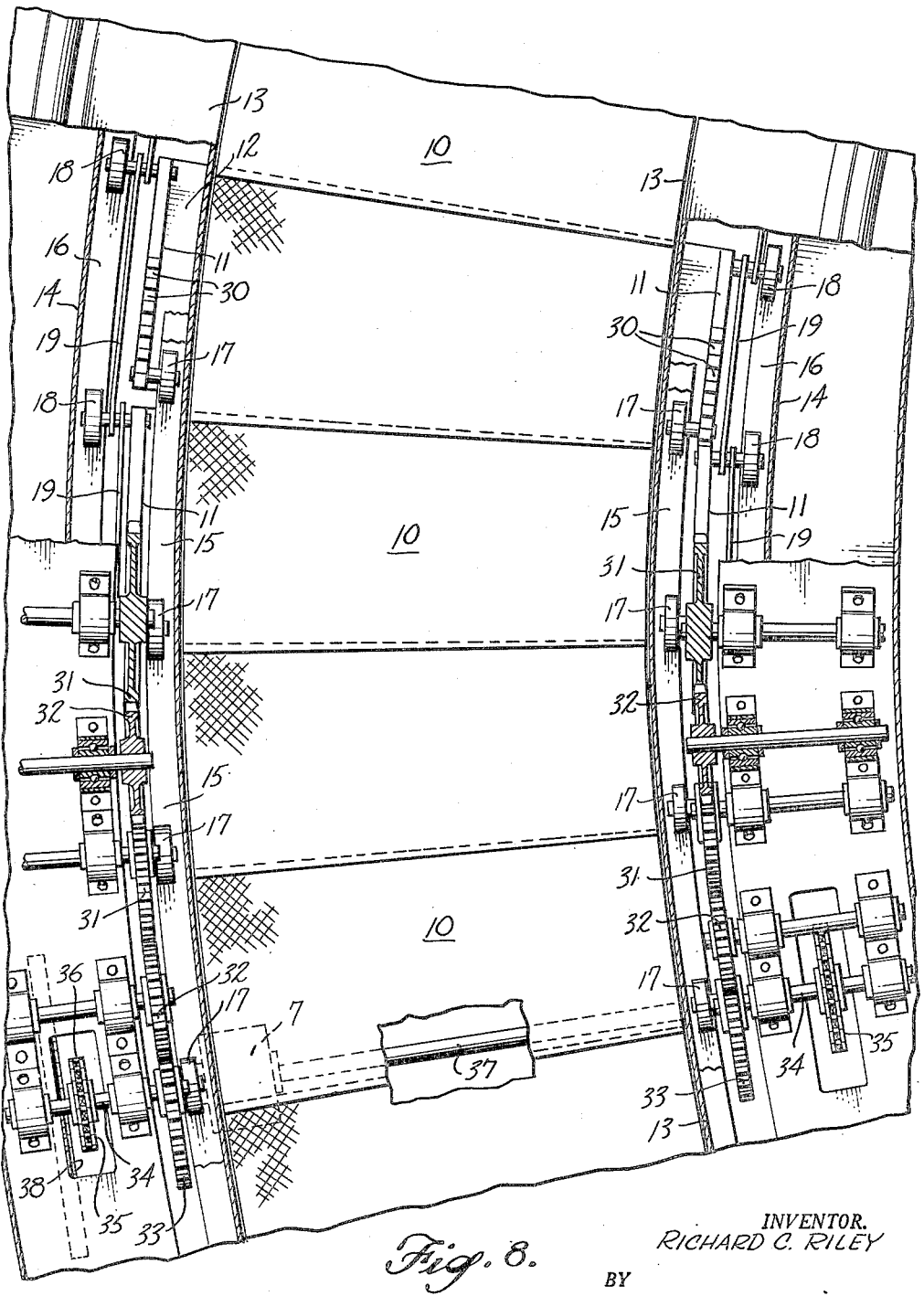
Figure 8 is a horizontal sectional view through the portion of the escalator including the drive mechanism taken on line 8—8 of Figure 7.

The drive mechanism, as shown in Figures 6, 7 and 8, exerts propulsive effort on the rack teeth 30 formed along the upper inclined edges of the end plates 11 on the tread and riser units. With these rack teeth mesh gears 31, of which there are several at opposite sides of the escalator. In Figure 7, for example, three such gears are shown, the axes of which are spaced apart distances corresponding to the spacing of the tread and riser units, so that driving force will be applied to a plurality of such units simultaneously. Moreover, as shown in Figure 8, the racks at both ends of each driven tread and riser unit will be engaged at the same time to balance the thrust on the units and thus avoid any tendency to skew the tread and riser units. The propulsive force thus applied will, of course, be transmitted to the other tread and riser units of the escalator through the interconnecting outer and inner linkage loops 19.

The inner and outer drive gears 31 will all be coordinated and rotated in the same direction. The gears at each side of the escalator will be interconnected by idler gears 32, and the first of these idler gears will be rotated by a main drive gear 33, which may also be in engagement with an end plate rack 30. The main drive gears 33 will be carried by shafts 34, on which are secured sprockets 35, which are turned by drive chains 36. These chains are driven by sprockets on a drive shaft 37 extending between the chains 36 at opposite sides of the escalator, and this shaft is turned by a single drive element 38 shown in Figure 6, which may take the form of a slow moving drive chain and sprocket 38. It will be seen, therefore, that as the shaft 37 is turned the chains 36, driven simultaneously, will in turn rotate all the gears 31 at opposite sides of the escalator. By selecting the proper size for the main drive sprockets 35 shown in Figure 8, the gears 31 at the inner side of the escalator will be rotated slower than the gears at the outer side in proportion to the difference in internal and external radii of the escalator. By this expedient the tread and riser units will all be moved accurately about their orbit.

While the drive mechanism described is shown as being used to drive tread and riser units having guiding mechanism such as disclosed in Figures 2, 3 and 4, this drive mechanism can be used equally well where the tread and riser units have guide mechanism such as shown in Figures 9, 10 and 11. While in the type of tread and riser unit supporting and guiding mechanism described above the rollers 17 and 18 are disposed at opposite sides of the end plate 11, it may be desirable in some instances to locate such end plates closer to the ends of the tread and riser units proper so that there will not be sufficient space between them to receive the flange 13 of the framework and the guide roller 17 and its supporting axle. Where the supporting rollers 17 and 18 are located on opposite sides of the end plates, the tracks may be disposed as shown in Figure 2, namely, at the left the track which is higher in the inclined portion of the escalator will be lower in relationship to the other track at the right of that figure. If both tread and riser unit supporting rollers 40 and 41 are located at the side of end plate 11' opposite the tread and riser unit 10 there would tend to be conflict between the axle 42 for roller 41 and the track for roller 40 where the tracks for such rollers reverse their elevational relationships in the ascending and descending flights. Where the guide rollers are both disposed at the same side of the end plate, therefore, only the roller 41 for each tread and riser unit will be effective for guiding purposes throughout the entire orbit of the escalator. This roller will roll on the track 43, which at the upper and lower horizontal portions of the escalator will be sufficiently wide to be engaged by the rollers 40 as well, as shown in Figure 10.

The roller 40, then, will be effective to support and guide the tread and riser units only during their movement along the descending flight of the escalator, when they will be in engagement with track 44, shown in Figure 9. This track will merge with the wide portions of track 43 as illustrated in Figure 10 at the upper and lower ends of the descending flight. In order to stabilize the tread and riser units 10 during their movement upward along the ascending flight of the escalator, an additional guide roller 45 is mounted on a downward projection 46 of the end plate 11'. This roller will engage the track 47 extending along the ascending flight, as shown at the left of Figure 9. Preferably the projection 46 is directed to a location immediately beneath roller 40, so that the axes of these rollers will be in substantially vertical registry. When the roller 45 is in engagement with track 47, therefore, it will effect substantially as good a stabilizing action as roller 40 when it is in engagement with track 44.

The extension 46 of the end plate 11' constitutes a convenient mounting for the thrust guide mechanism. As discussed in connection with the type of mechanism shown in Figures 2, 3 and 4, this thrust guide may include a roller 20 carried by a spring-pressed plunger 22 and running in a track 21. The roller mounting will, of course, swivel to enable the roller to follow such track as the tread and riser unit carrying the roller moves from the ascending flight through the horizontal portion of the escalator to the descending flight.

If guide mechanism for the tread and riser units like that shown in my prior application is employed, such as shown in Figures 12, 13 and 14, special provision must be made for avoiding conflict of the track mechanism and the longer roller axle at the junctions between the escalator flights and the horizontal escalator portions. As in the previous forms of the invention described, the framework flange 13 projects downward into the groove between the end plate 11'' carried by the tread and riser unit and the adjacent end of such unit. This end plate also carries the axles supporting the guide rollers 50 and 51 which run on tracks 52 and 53, respectively.

Since both of these rollers are mounted on the same side of the end plate 11'', namely that remote from the adjacent end of the tread and riser unit, the axle carrying one of these rollers, namely roller 51, must be longer than the other. As the tread and riser unit approaches the horizontal portion of the escalator, therefore, along a flight such as shown in Figure 12, where the unit is shown moving upward to the upper horizontal portion, the axle 54 carrying the roller 51 would conflict with the track 52 before it reached the horizontal portion. For that reason the track 52 includes a hinged section 55 which is shown in Figure 12. This section is engageable by the axle 54 from below and is swung upward to allow the axle to pass through the gap thus formed. As soon as the axle passes this gap, the next roller 50 will ride on the swingable track section 55 and press it downward again into wheel-bearing position.

A similar expedient is necessary where the tread and riser unit passes from the lower horizontal portion of the escalator into the upward flight, as shown in Figure 13. In this instance a switch arrangement includes a section 56 of track 52 pivoted to swing downward when engaged by axle 54. A light spring 57 holds this track section normally upward in closed position, but it could not overcome the weight of loaded wheel 50. Consequently a lever 58, part of track 53, pivoted to an arm 59 beneath track section 56, it held down by roller 51 to sustain track section 56 while the following roller 50 passes over it.

Figure 17:
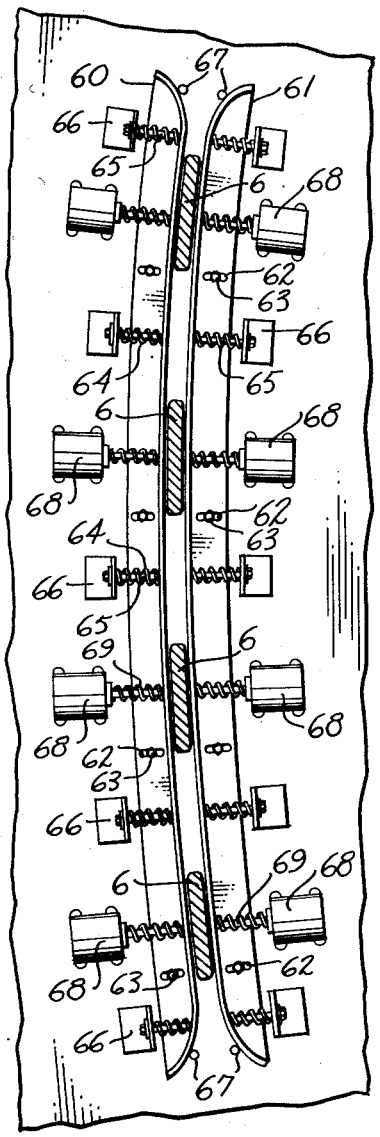
Figure 17 is a view of the safety switching mechanism taken on line 17—17 of Figure 15.
Figure 15:
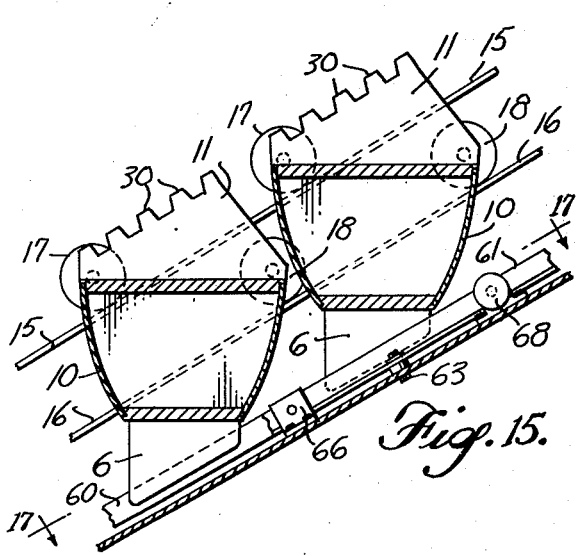
Figure 15 is a circumferential sectional view through a flight portion of the escalator, showing safety switching mechanism.
Figure 16:
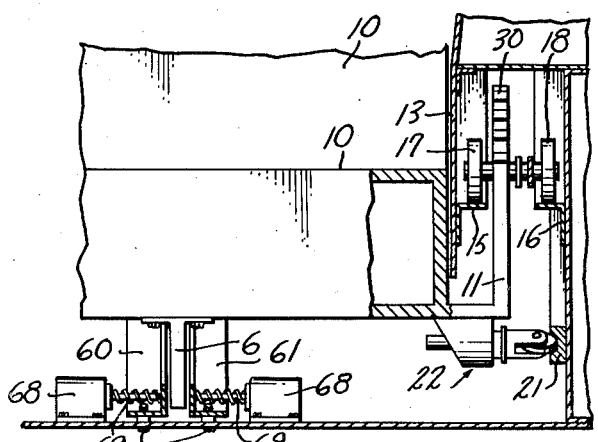
Figure 16 is a radial sectional view through the same portion of the escalator showing such switching mechanism.

Obviously it will be desirable to interrupt movement of the escalator if unusual binding action should occur, or if the linkage 19 should break on one or both sides of the escalator, allowing successive play in its orbit. Consequently, mechanism such as shown in Figures 15, 16 and 17, for example, may be provided as an emergency control to deenergize the driving mechanism in either of these events. It will be understood that such safety mechanism may be incorporated with any of the types of escalator described above. The mechanism consists of a fin 6 extending downward below the tread and riser unit 10, in position to engage between rails 60 and 61 at some location around the escalator orbit, such as in the ascending flight. These rails are provided with slots 62 spaced along their lengths, in which anchor bolts 63 are received. Normally the rails are urged toward each other by springs 64 encircling guide rods 65 and interposed between flanges of the rails and abutment members 66. These springs will push the rails toward each other until they engage stops 67 to limit such movement at a location affording spacing between the rails adequate to receive the fins 6 between them without appreciable friction being caused by movement of the fins between the rails.

Also arranged along the lengths of rails 60 and 61 at their opposite sides are switch elements 68 all arranged in series and in series with the power source for energizing the escalator drive mechanism. Between these switches and the rails 60 and 61 are rods 69 which actuate the switches to open them upon movement of either rail 60 or 61 in either direction. Around these rods 69 may be disposed additional springs to assist springs 65 in maintaining the rails centered normally. If the escalator should tighten excessively, such as would result from a part of the escalator catching on the framework or encountering excessive friction, one end or the entire length of rail 61 on the inner side of the escalator will be moved to actuate one of the switches, or more, at the right of Figure 17. Alternatively, if the escalator should break, the springs of centering plungers 22 would shift the entire escalator section between the rails radially outward to move rods 69 at the left of Figure 17 sufficiently to break one of the switches at the left of that figure as a result of movement of rail 60. In either event, therefore, the source of power supply to the drive mechanism would be interrupted and the escalator would be stopped, thereby minimizing damage to the escalator system and injury to any passengers who may be riding on it.

At the time such binding or break occurs, it would also be desirable to stop movement of the escalator just as promptly as possible. In addition to deenergizing the drive mechanism, therefore, a brake 7 may be provided for the drive shaft 37 as shown in Figures 6 and 8. This brake may be of the solenoid actuated type, the solenoid of which is in circuit with the power source, and the switches 68 of the safety control mechanism shown in Figures 15, 16 and 17. As long as the power supply to the driving mechanism is not interrupted, therefore, the solenoid of brake 7 will hold it in released position. As soon as the power supply to the drive mechanism is interrupted by breaking of any of switches 68, or, indeed, by intentional manual deenergization of the power source for the purpose of stopping the escalator, brakes 7 will automatically be applied, such as by spring action. It will be evident that the particular details of the brake 7 are not important to the present invention, and any suitable type of spring-applied and solenoid-released brake can be used.

I claim as my invention:

1. Escalator mechanism comprising an endless loop of tread and riser units including an ascending flight and a descending flight, each of said tread and riser units having an end plate at each end thereof and carried thereby, each of said end plates having an inclined rack on the upper edge thereof inclined corresponding to the inclination of an escalator flight for disposition of adjacent rack sections at opposite ends of said tread and riser units, respectively, substantially in alignment during movement of such adjacent tread and riser units along an escalator flight, and drive gearing disposed adjacent to opposite sides of an escalator flight and engageable simultaneously with said rack sections at both ends of at least two adjacent tread and riser units simultaneously during movement thereof along such escalator flight for driving the escalator.

2. The escalator defined in claim 1, and means disposed beneath the escalator flight adjacent to which the drive mechanism is disposed, and operable to interconnect and drive conjointly the gearing engaging the rack sections at opposite ends of the adjacent escalator tread and riser units.

3. Escalator mechanism comprising an endless loop of tread and riser units including an ascending flight and a descending flight, each of said tread and riser units having an end plate at each end thereof and carried thereby, each of said end plates having an inclined rack on the upper edge thereof inclined corresponding to the inclination of the ascending escalator flight for disposition of adjacent rack sections at opposite ends of said tread and riser units, respectively, substantially in alignment during movement of such adjacent tread and riser units along the ascending escalator flight, and drive gearing disposed adjacent to opposite sides of the ascending escalator flight and engageable simultaneously with said rack sections at both ends of at least two adjacent tread and riser units simultaneously during movement thereof along the ascending escalator flight for driving the escalator.

4. Escalator mechanism comprising an endless loop of tread and riser units including an ascending flight and a descending flight, drive means operable to move said escalator around such loop, framework adjacent to the path of said tread and riser units moving in such loop, two elongated tracks carried by said framework adjacent to the path of movement of said tread and riser units along such loop, having their lengths extending along such path and spaced apart transversely of said path, means supporting said tracks for movement of each away from the other transversely of such path of tread and riser unit movement along such loop, and a member carried by a tread and riser unit engageable between said tracks and movable therebetween by movement of such tread and riser unit along the path of such loop and operable by radial movement of such member to shift one of said tracks transversely of its length, and safety switch means operable by movement of one of said tracks to effect deenergization of said escalator drive means.

5. The escalator defined in claim 4, and brake means engageable with the drive means and operable to stop the same quickly upon deenergization thereof.

References Cited in the file of this patent

UNITED STATES PATENTS

| Number | Name | Date |
|---|---|---|
| 829,152 | Hocquart | Aug. 21, 1906 |
| 888,949 | Wheeler | May 26, 1908 |
| 999,885 | Seeberger | Aug. 8, 1911 |